United States Patent [19]
Lowe

[11] 3,951,130
[45] Apr. 20, 1976

[54] ISOLATING DAMPER FOR CLOSING A DUCT

[75] Inventor: Walter Max Lowe, London, England

[73] Assignee: Thermo-Technical Development Limited, London, England

[22] Filed: Nov. 14, 1973

[21] Appl. No.: 415,535

[30] Foreign Application Priority Data
Nov. 24, 1972 United Kingdom............... 54474/72

[52] U.S. Cl. .............................. 126/285 B; 98/41 R; 251/58; 251/86; 251/138; 251/299; 251/333
[51] Int. Cl.² ...................... F23L 3/00; F23L 11/02; F23L 13/10
[58] Field of Search ......... 126/285 R, 285 B, 285.5, 126/286; 251/138, 298, 299, 333, 86, 65, 58; 98/41 R

[56] References Cited
UNITED STATES PATENTS

| | | |
|---|---|---|
| 2,033,398 | 3/1936 | Rogers ................................. 126/286 |
| 2,121,707 | 6/1938 | McGee .............................. 251/299 |
| 2,224,705 | 12/1940 | Stringer........................... 126/285 B |
| 2,660,396 | 11/1953 | Haegerty............................ 251/298 |
| 3,010,692 | 11/1961 | Jentoft............................. 98/41 R X |
| 3,035,810 | 5/1962 | Lowe et al. ......................... 251/298 |
| 3,290,001 | 12/1966 | Taylor................................. 251/333 |

Primary Examiner—William F. O'Dea
Assistant Examiner—Ronald C. Capossela
Attorney, Agent, or Firm—Irving M. Weiner; Pamela S. Burt

[57] ABSTRACT

An isolating valve or damper for the gas-tight closure of a flue or duct, comprising a frame or housing fitted in the flue or duct and a closure member operable between an open position and a closed position in which the member closes the flue or duct, wherein the closure member is a lightweight low inertia body, preferably a cone or a sphere, and wherein the closure member may be moved between its open and closed positions by means of a rapid-acting operator.

15 Claims, 9 Drawing Figures

FIG. I.

ISOLATING DAMPER FOR CLOSING A DUCT

This invention relates to isolating valves and isolating dampers.

BACKGROUND OF THE INVENTION

Isolating valves of various types are known which provide a gas-tight seal, for example, by means of cantilever sealing springs fitted to steel plates. The main purpose of such valves is to prevent cooling of the boilers and chimneys during the periods when the burners cut out periodically during operation because a pre-set temperature or steam pressure has been reached. Technical development in this field has led to a considerable growth in the use of these types of boilers with automatic operation, many of which are operated on an "on-off" cycle, i.e., they are always fully on or fully off. Other boilers are flame-modulated and switch over to on-off firing only during low-load periods which, with central heating and hot water boilers, are frequent during the greater part of the year.

During the off part of the cycle, cold air is drawn through the boiler and cools metal and water and flues and chimneys. The heat loss during the first fraction of the off-cycle is far greater than during the entire remainder of the off-cycle because then the temperature difference between the cold air and the still-hot metal surface is at its maximum value. This cooling effect not only wastes a substantial amount of fuel, but also causes smuts and air pollution and leads to corrosion of boiler, flues and chimneys.

A common firing characteristic of these types of boilers is that their on-off firing cycle is very short, even with oil-fired boilers. This is particularly so with gas-firing where cycles of 2 to 3 minutes and less are frequent.

Automatic isolating dampers for these comparatively small boilers must be simple in construction to be economical. They usually consist of a pivoted steel plate moved by a geared motor, and require up to half a minute and even more to move between their terminal positions. It is clear that this time is far too long because during the time taken by the damper to fully close the greatest part of the heat which might have been retained will have been lost. This loss may be further increased by further delay when starting up caused by the necessarily slow movement of the damper. The weight alone of the damper blade apparently precludes any appreciable speeding up of the movement of the damper.

Furthermore, when closed, these dampers do not provide any safety against furnace explosion or pressure waves. An aperture in the damper plate is frequently provided to guard against explosions, but this would prevent any heat preservation. Alternatively, an additional explosion door would be necessary.

Moreover, this preservation of heat is only possible if the damper or valve gives a virtually gas-tight seal when in the closed position. Even a very small leakage equivalent to 0.05% of the duct area would result in heat losses obviating any advantages gained. To eliminate or at least reduce leakage it is desirable to employ a thinner damper blade, but the thinner the damper blade the more the blade is liable to warpage and misalignment in service.

A light flexible flat disc is not suitable as a closing member since it would have to be deflected to make a seal. This would decrease the diameter of the disc or annulus, put the outer margin under compressional stress, and cause it to buckle.

SUMMARY OF THE INVENTION

The present invention relates to an isolating valve or damper which will give a gas-tight seal in the closed position, and which can be moved with relatively great speed between the terminal open and closed positions.

The invention consists in an isolating valve or damper for the gas-tight closure of a flue or duct, comprising a frame or housing fitted in the flue or duct, a closure member operable between an open position and a closed position in which the member closes the duct or flue, the closure member comprising a light-weight low inertia body.

Isolating valves and dampers according to the invention may be advantageously used in oil or gas-fired boilers, but may also find use in other applications.

The closure member is preferably a cone subtending a very wide angle at its apex. If tensioned by sealing pressure the outer margin of the cone is subject only to tensional stresses and will not buckle. The closure member may alternatively be a sphere or a body made of any other suitable shape. The closure member is preferably constructed of thin stainless steel, although alternatively other metals or an elastomer or a plastic material could be used.

The closure member, usually a cone as described above, is preferably operated by means of a rod or arm with which it is associated and which is actuated by a rapid-acting operator, such as a high-speed motor, a solenoid, or a spring, to move the closure member between the terminal open and closed positions.

The apex of the cone will usually be fitted to the operating arm, either movably so that the cone is self-adjusting to its seating in the closed position, or fixed rigidly to the end of the operating arm.

The valve or damper may be made safe by providing means which will cause the valve or damper to open to permit gas to escape towards the chimney if the gas pressure in the boiler furnace or flues should rise above a predetermined safe value. In one arrangement the operating arm may itself include or consist of a flexible spring member of a strength sufficiently low to ensure that it will give way if an unsafe pressure wave develops at the boiler side, and will thus release the gas into the chimney. Alternatively, a rigid operating arm may be used instead of a flexible arm. In this case the required explosion relief characteristics are usually provided by a flexible elastic linkage between the arm and the sealing cone.

In a preferred embodiment, the cone comprising the closure member moves radially with respect to the flue or duct axis along a circular path over an arc of approximately 90°. The cone is fixed to an arm consisting of a flat spring so arranged and adapted that, in the closed position, the arm will press the sealing cone tightly against its seating. In the open position the arm will withdraw the cone out of the gas stream.

The arm is preferably fixed to a spindle which is rotated by means of a geared electric motor to move the cone radially with respect to the flue or duct axis between the open and closed positions.

Alternatively, the arm may be fixed to a spindle which carries an extension to which a tension spring is fixed. If released, the tension spring will urge the cone into its closed position. In operation, a thermostat or pressure-stat signals the need to open the valve (prior to lighting the burner) whereupon a solenoid is energised and rotates the shaft spindle thereby expanding, i.e., stretching, the tension spring. When the arm reaches its terminal open position it is held by a spring-loaded catch which can be withdrawn by its own solenoid. When the thermostat or pressure-stat calls for an off-cycle of the burner, i.e., the closing of the valve, a signal from the burner will energise the small solenoid which will withdraw the catch holding the valve open, thereby releasing the main tension spring closing the valve.

Moreover, the tension spring could be so arranged to be pulled alternately in opposite directions by two solenoids, one pulling the valve cone into the closing position, and the other solenoid pulling the cone into the open position.

In another preferred embodiment, the cone comprising the closure member is moved as a flap from the open position where the plane of the cone is approximately parallel to the flue or duct axis to the closed position where the cone is across the flue or duct.

The closure member could also be constructed as a poppet valve opening and closing along the axis of the flue or duct.

The low-inertia character of the closure member lends itself to the use of quick-running small motors operating the closure member quickly between the open and closed positions.

The operating gear of the valve may be operated by means of spring members in order to reduce inertia to a minimum.

The housing may comprise a fixed part fitted across the duct or flue and a detachable part which incorporates the sealing means, all moving parts, and the operating gear.

BRIEF DESCRIPTION OF THE DRAWINGS

The invention will be further described, by way of example only, with reference to the accompanying drawings, in which.

DETAILED DESCRIPTION

Figure 1:
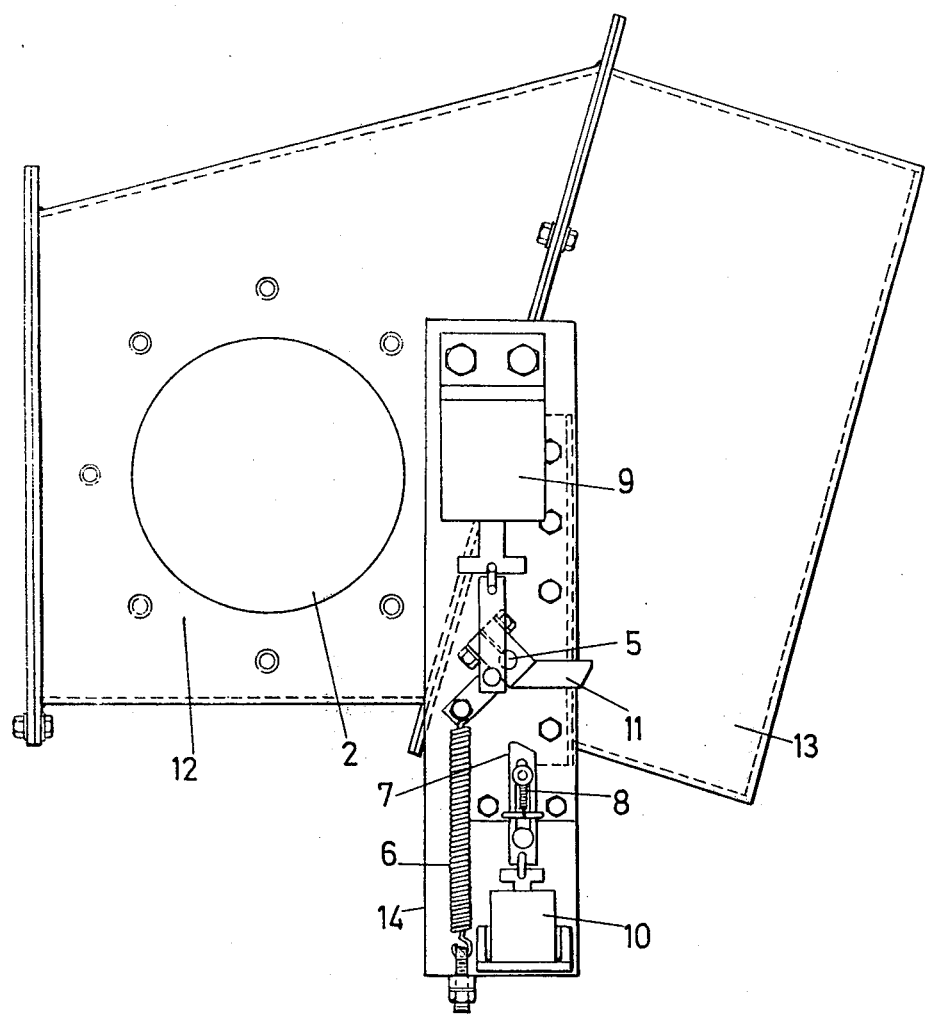
FIG. 1 is a plan view of one embodiment of an isolating valve in a vertical flue.

In the drawings, like reference numerals indicate like components.

Figure 2:
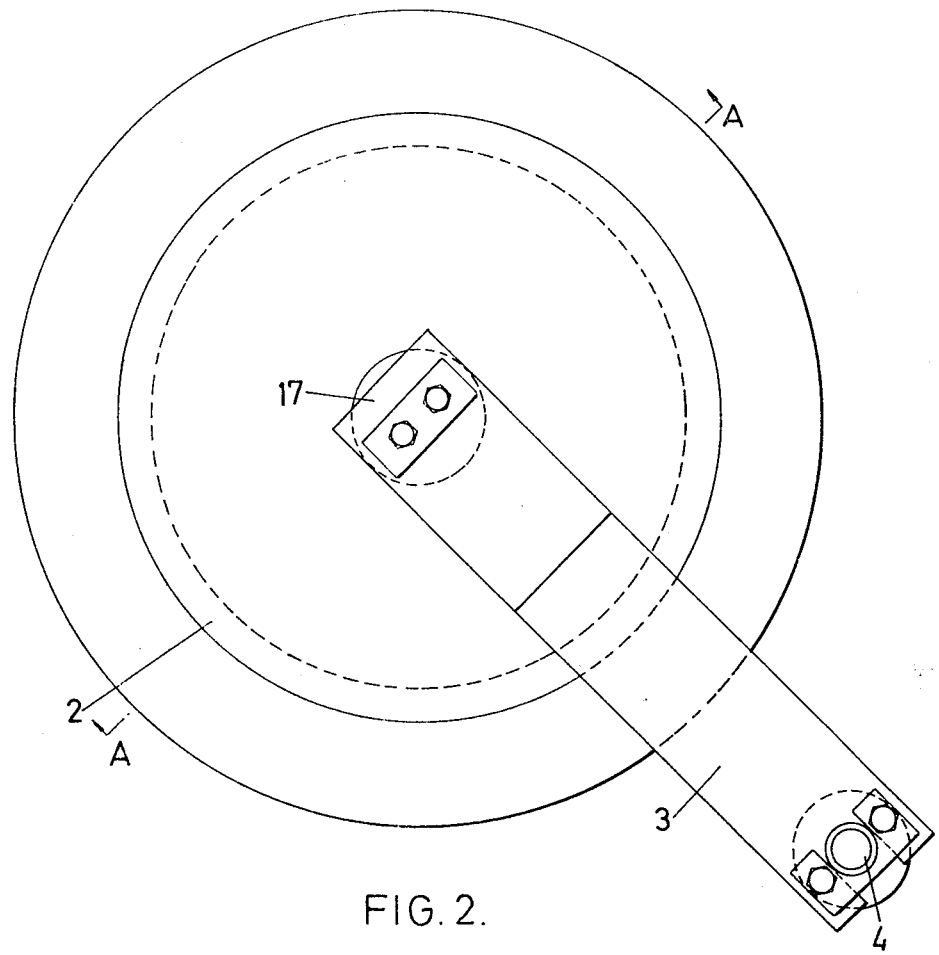
FIG. 2 is a plan view of the sealing cone of the isolating valve shown in FIG. 1.
Figure 3:
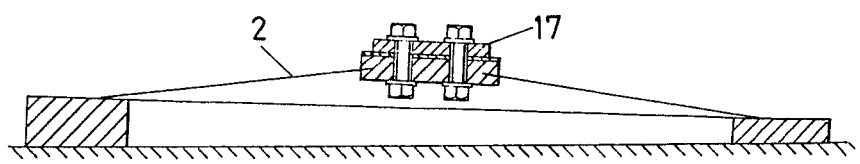
FIG. 3 is a section taken along the line A—A in FIG. 2.

FIGS. 1 to 3 of the drawings relate to an arrangement wherein the closure member moves radially along an arc of a circular path between the terminal open and closed positions. In FIGS. 1 to 3, a cone 2 is fixed by means of a central fixture 17 to a flexible operating arm 3. The angle subtended at the apex of the cone is suitably greater than 110°, and preferably lies between 150° and 170°. The end of the arm 3 remote from the fixture 17 is, in turn, fixed to one end of a vertical spindle 4. To the other end of the spindle 4 is attached one end of a spindle extension arm 5, to the other end of which is attached a tension spring 6. The tension spring 6 is such that if released it will urge the sealing cone into its closed position.

The housing in the flue comprises two parts, one part 12 being fixed across the flue and the other part 13 being detachable. All moving parts, including the sealing cone and the operating gear 14, are positioned in the detachable part so that in case of servicing requirements the detachable part can simply be replaced without need to move the fixed housing part.

When the operating conditions of the boiler give a signal to require the isolating valve to open, for example, prior to lighting the boiler, a solenoid 9 is energised which pivots the operating arm 3 into the open position of the valve thereby expanding, i.e., tensioning, the tension spring 6 until the operating arm reaches its terminal position where it is held by a catch 7 that is spring-loaded by a small spring 8.

When the thermostat or pressure-stat of the boiler signals to the burner to switch off, it will also cause the energising of a solenoid 10, thus releasing catch 7 and freeing a bell crank lever 11 on the spindle 4, and the tension spring 6 will urge the operating arm 3 and the cone 2 into the closed position, thereby completing the cycle.

As shown in FIG. 3, the sealing cone 2 is mounted at a slight angle and its seating is correspondingly inclined. This prevents the thin sealing cone edge from sliding on the face of the housing when moving, but rather allows it to swing free.

The operating arm 3 is a thin elastic flexible laminated leaf spring and will press the cone 2 into its seating, as shown in FIG. 3. However, should the pressure on the boiler side rise above a predetermined limit, the cone will be pressed off its seating thereby lifting the flexible operating arm and releasing the gas surplus.

Figure 4:
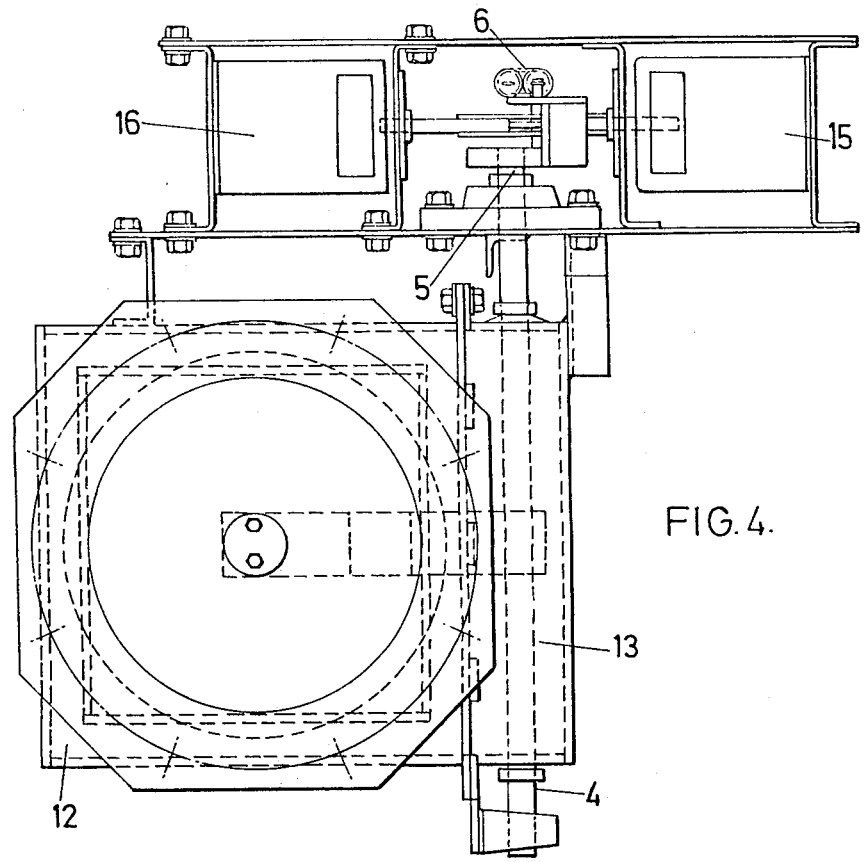
FIG. 4 is a plan view of an alternative embodiment of an isolating valve in a vertical flue.
Figure 5:
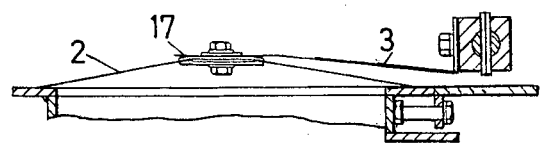
FIG. 5 is a vertical section through the sealing cone of the isolating valve shown in FIG. 4.

FIGS. 4 and 5 relate to an arrangement wherein the closure member is moved as a flap between the terminal open and closed positions, the cone 2 being swung down onto a flat seating, as shown in FIG. 5. The extension arm 5 attached to the spindle 4 is engaged by a tension spring 6 and held in the open position. If a push-closed solenoid 15 is energised from the burner it will push the extension arm 5 and thereby move the tension spring 6 over its extreme extension point, thereby causing it to pull the sealing cone 2 into the closed position.

When the boiler conditions demand opening of the sealing cone from its closed position, the boiler will energise the push-open solenoid 16 which will act on the operating arm extension 5 and cause the cone to open, thereby completing the cycle.

As in the previous embodiment, the housing consists of two parts, one part 12 being fixed across the flue and the other part 13 being detachable.

Figure 6:
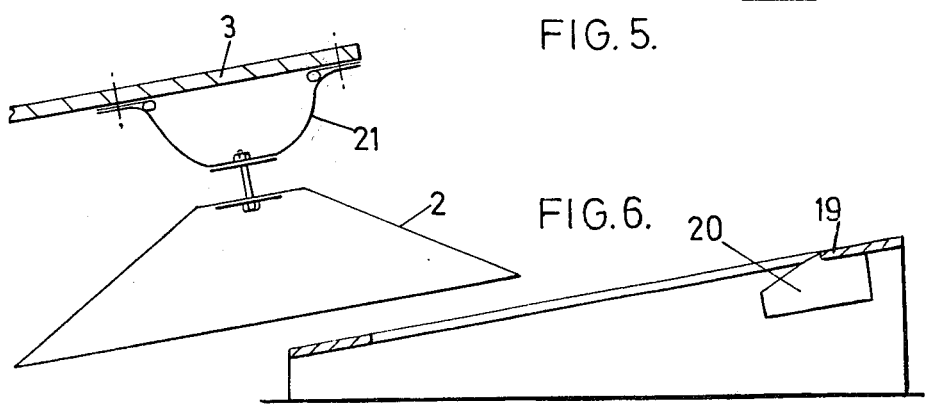
FIGS. 6, 7 and 8 are each side views, partly in section, illustrating the operation of a flexible elastic linkage between a sealing cone and a rigid operating arm.
Figure 7:
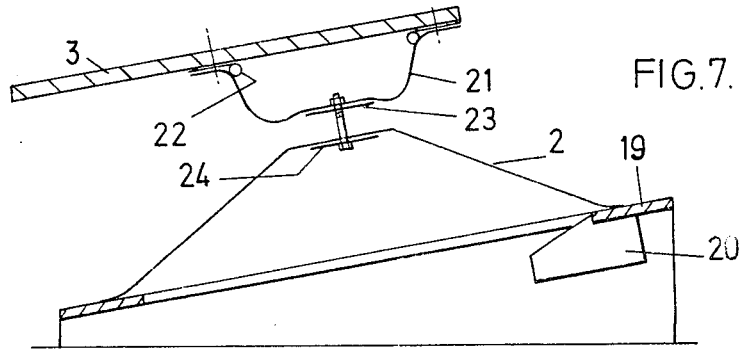
Figure 8:
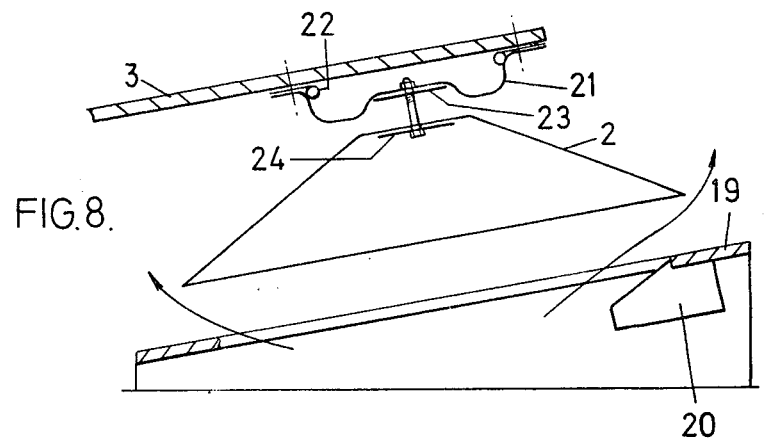

FIGS. 6 to 8 illustrate an example of a flexible elastic linkage between the sealing cone and a rigid operating arm. An arched leaf spring strip 21 is fixed to the operating arm 3. The strip 21 is supported at its outer edges by spaced stops 22. The center of the arch is rigidly connected by a disc 23 to a rigid holding piece 24 attached to the cone 2.

Under normal operating conditions the arched spring 21 will ensure proper sealing of the cone, as shown in FIG. 7. However, when the pressure at the furnace side passes a predetermined limit, the spring 21 will collapse and withdraw the cone 2 from its seating 19, 20, as shown in FIG. 8, to allow gas to flow freely to the chimney.

When the over-pressure of the boiler side subsides the elastic strip 21 will, due to the tension set up in its outer margin by the stops 22, return to its original arched position thereby again pressing the cone 2 against its seating and thus restoring the seating effect. The valve acts as an automatically re-setting safety valve and, for suitable applications, can be employed as such.

Figure 9:
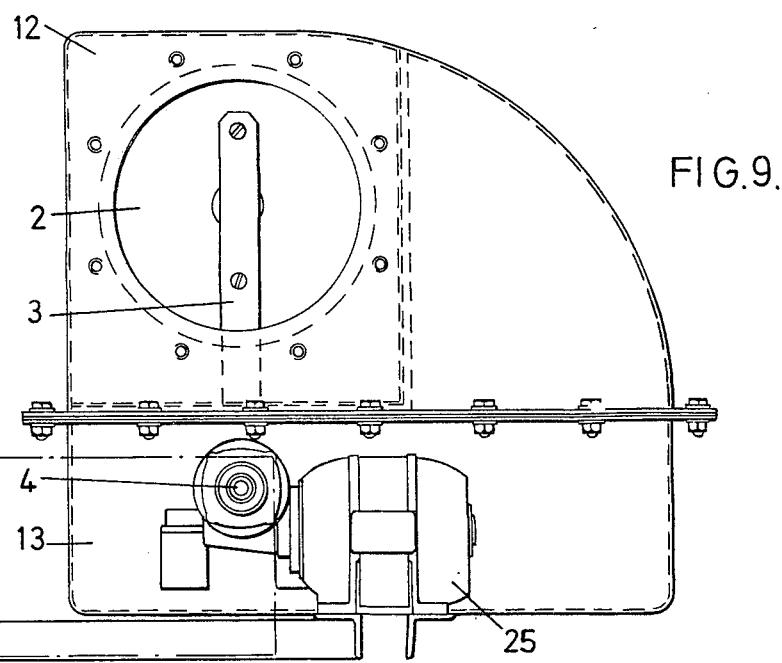
FIG. 9 is a plan view of another alternative embodiment of an isolating valve in a vertical flue.

FIG. 9 shows another arrangement wherein the closure member moves radially along an arc of a circular path between the terminal open and closed positions. In FIG. 9, a cone 2 is attached to one end of a flexible operating arm 3, the other end of which is fixed to a vertical spindle 4. The spindle 4 is rotatable by means of a geared electric motor 25 to move the cone 2 both to and from the position where it closes the duct or flue, without there being provided a spring and leaf catch as is usually used when a solenoid arrangement is employed.

The use of a geared motor rather than a solenoid arrangement is preferable because it is both cheaper and quieter. A motor operating with a 12½ r.p.m. output, giving a closing time of approximately one second, may be employed.

It is possible to modify the drive arrangement from the motor to move the cone as a flap from the open position, where the plane of the cone is approximately parallel to the flue or duct axis, to the closed position where the cone lies across the flue or duct.

As in the previous embodiments, the housing consists of two parts, one part 12 being fixed across the flue or duct and the other part 13 being detachable. When operated by a quick-running motor, the motor and couplings are mounted on a plate which is carried on the detachable part 13 of the housing.

I claim:

1. An isolating valve for closing a duct, comprising, in combination:
   a duct;
   a frame fitted in said duct;
   a closure member operable between an open position, in which said duct is open, and a closed position in which said member closes said duct;
   said closure member being a light weight low-inertia body comprising a hollow cone;
   a seating connected to said frame;
   said cone having an inside surface of an outer edge cooperating with said seating when said closure member is in said closed position; and
   said cone having such an angle at its apex and being formed from a thin material that has such a tensile strength to permit elastic deformation of said cone outer edge by said seating to increase said angle at the apex of said cone.

2. An isolating valve according to claim 1, including:
   an operating gear for said closure member; and wherein said frame comprises a first part fixed across said duct and a second part detachable from said first part and removable from said duct, said closure member and said operating gear therefor being incorporated in said second part.

3. An isolating valve according to claim 1, including:
   an arm associated with said closure member for operating said closure member; and
   a rapid-acting operator for moving said closure member between said open and closed positions.

4. An isolating valve according to claim 3, including:
   a poppet valve arranged to open and close along the axis of said duct.

5. An isolating valve according to claim 3, wherein said arm comprises:
   a flexible spring member of a strength to ensure that it will give way if an unsafe pressure wave develops on one side of said isolating valve, and will re-set itself when said pressure wave has passed.

6. An isolating valve according to claim 3, wherein:
   said arm is rigid; and
   there is provided a flexible self-adjusting elastic linkage between said arm and said closure member which will collapse if an unsafe pressure wave develops on one side of said isolating valve and will re-set itself when said pressure wave has passed.

7. An isolating valve according to claim 3, including:
   means for moving said closure member radially with respect to a longitudinal axis of said duct along a circular path between said open and closed positions.

8. An isolating valve according to claim 7, wherein:
   said arm comprises a flat spring which presses said closure member tightly against said seating in said closed position.

9. An isolating valve according to claim 7, including:
   a rotatable spindle to which is fixed said arm; and
   a geared electric motor for moving said closure member between said open and closed positions.

10. An isolating valve according to claim 7, including:
    a rotatable spindle to which is fixed said arm;
    a solenoid for moving said closure member to said open position;
    a catch for holding said arm in said open position; and
    a tension spring for urging said closure member to said closed position when said catch is released.

11. An isolating valve according to claim 7, including:
    a rotatable spindle to which is fixed said arm;
    a first solenoid for moving said closure member to said open position by rotating said spindle in one direction; and
    a second solenoid for moving said closure member to said closed position by rotating said spindle in the opposite direction.

12. An isolating valve according to claim 3, including:
    means for moving said closure member as a flap from said closed position, where it lies against said duct, to said open position which is substantially perpendicular to said closed position.

13. An isolating valve according to claim 12, including:
    a rotatable spindle to which is fixed said arm; and
    a geared electric motor for moving said closure member between said open and closed positions.

14. An isolating valve according to claim 12, including:
    a rotatable spindle to which is fixed said arm;
    a solenoid for moving said closure member to said open position;
    a catch for holding said arm in said open position; and a tension spring for urging said closure member to said closed position when said catch is released.

15. An isolating valve according to claim 12, including:
   a rotatable spindle to which is fixed said arm;
   a first solenoid for moving said closure member to said open position by rotating said spindle in one direction; and
   a second solenoid for moving said closure member to said closed position by rotating said spindle in the opposite direction.

* * * * *